United States Patent [19]

Walters

[11] Patent Number: 4,635,390

[45] Date of Patent: Jan. 13, 1987

[54] FISHING ROD SUPPORT

[76] Inventor: Haven B. Walters, 12723 22nd Ave. Northeast, Seattle, Wash. 98125

[21] Appl. No.: 741,984

[22] Filed: Jun. 6, 1985

[51] Int. Cl.$^4$ ............................................. A01K 97/10
[52] U.S. Cl. ..................................... 43/21.2; 248/538
[58] Field of Search ................. 43/21.2; 248/525, 526, 248/538, 316.5, 534, 535, 536; 24/495, 648

[56] References Cited

U.S. PATENT DOCUMENTS

| | | | |
|---|---|---|---|
| 1,963,463 | 6/1934 | Hammer | 248/316.5 X |
| 2,516,245 | 7/1950 | Nickerson | 43/21.2 |
| 2,626,770 | 1/1953 | Norman | 248/534 |
| 2,682,127 | 6/1954 | Binder | 43/21.2 |
| 2,851,813 | 9/1958 | Gugliotta | 43/21.2 |
| 2,890,847 | 6/1959 | Minton et al. | 248/534 |
| 4,245,419 | 1/1981 | McManus | 43/21.2 |
| 4,529,112 | 7/1985 | Miller | 43/21.2 X |
| 4,586,688 | 5/1986 | Hartman et al. | 248/538 |

FOREIGN PATENT DOCUMENTS

| | | | |
|---|---|---|---|
| 554898 | 2/1957 | Belgium | 43/21.2 |
| 988067 | 4/1976 | Canada | 43/21.2 |
| 2442009 | 7/1980 | France | 43/21.2 |
| 2508765 | 1/1983 | France | 43/21.2 |

*Primary Examiner*—Nicholas P. Godici
*Assistant Examiner*—Carmine Cuda
*Attorney, Agent, or Firm*—Ward Brown; Robert W. Beach

[57] ABSTRACT

A horizontally elongated housing has upright end plates at the opposite ends of the housing with aligned upward-opening slots into which a section of a fishing rod may be inserted. Rotors having undercut hook portions extend between and are rotatably mounted on the housing end plate for swinging about parallel axes extending longitudinally of the housing. The rotor hook portions are automatically moved by insertion of the rod from positions out of registration with the end plate slots to positions registered with the slots and hooked over the top of the rod.

12 Claims, 6 Drawing Figures

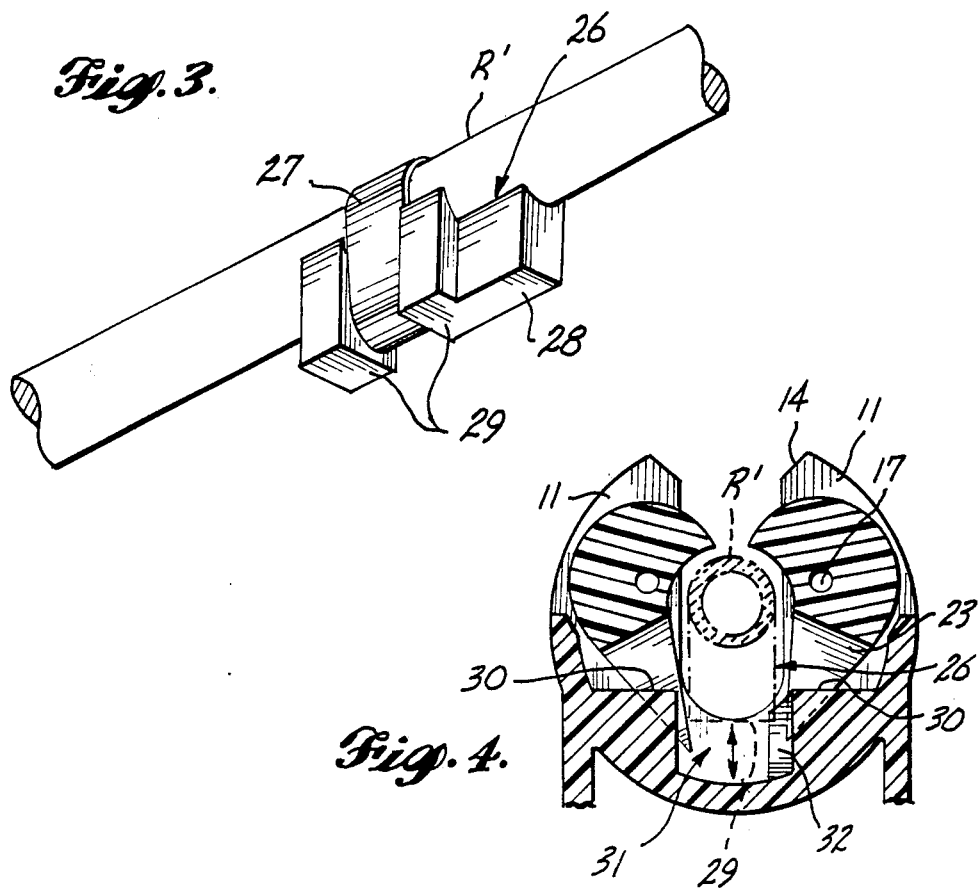
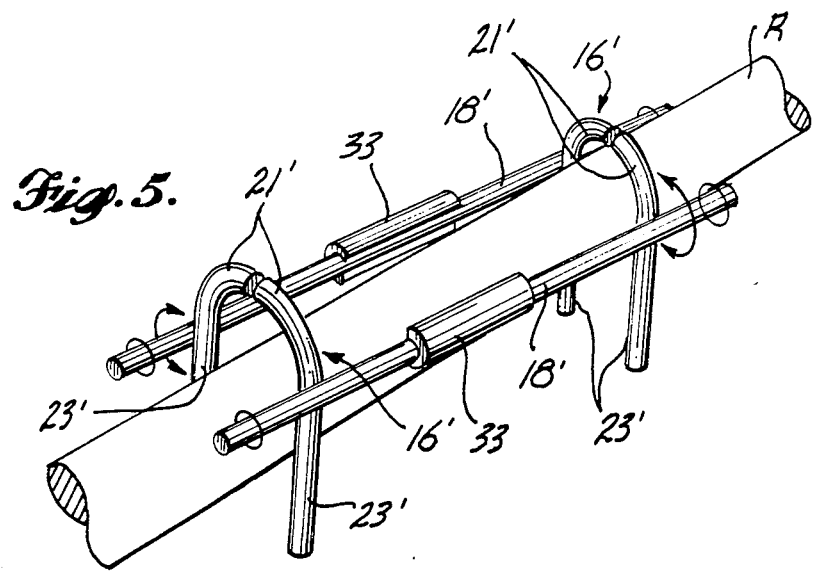

FISHING ROD SUPPORT

BACKGROUND OF THE INVENTION

1. Field of the Invention

The present invention relates to a device for supporting a fishing rod during fishing.

2. Prior Art

The oldest known fishing rod support used when fishing from a bank is a simple forked stick inserted into the ground for supporting the rod in upward-inclined position with the butt resting on the ground. In a boat, the rod may be laid across the gunwale or rail with the butt resting inside the boat. In either case, the butt portion of the rod may be stepped on or kicked and the reel is inconveniently positioned at a low level.

Known rod holders can be supported in or on the ground or mounted on a boat and include an eye or cylinder into which the butt of the rod is inserted. Removal of the rod from such a holder is inconvenient. If the rod is removed quickly, such as immediately after a bite is detected, there may be sufficient disturbance of the line so as to result in a lost fish.

SUMMARY OF THE INVENTION

It is an object of the present invention to provide a device for reliably and securely supporting a fishing rod in a convenient position during fishing.

It also is an object to provide such a device which allows the rod to be inserted and removed quickly and easily with little disturbance of the line.

An additional object is to provide such a device in a form capable of supporting the rod by engagement with almost any section of the rod and adapted for supporting rods of different sizes and designs.

Another object is to provide such a device capable of supporting a fishing rod in any desired rotated position.

In the preferred embodiment of the present invention, the foregoing objects are accomplished by a fishing rod support having a housing with upward-opening slots into which the rod may be inserted, and one or more hook members normally positioned out of registration with the slots. Mechanism is provided to assure that the hook members are automatically moved over the top of the rod when it is inserted in the housing slots, and such hook members are automatically moved out of registration with the slots when the rod is translated upward from the housing to remove it.

The hook members can be formed on rotors mounted on the housing for rotation about axes extending substantially parallel to the length of the rod. The rotors can be counterbalanced to their normal or open positions in which their hook members or portions are out of registration with the slots. The rotors can have downward-projecting legs normally extending at least partway across the housing slots and engaged by the rod when it is inserted so as to swing the rotors, so that undercut hook portions at the top of each rotor extend over the top of the rod.

In the preferred embodiment, such rotors are provided at opposite sides of the housing for rotation in opposite senses by insertion of the rod. Longitudinal sliding movement of the rod can be limited by positioning the rod in the holder with a ferrule or eyelet engaged against the end of the housing. Alternatively, a tab or block can be mounted on the rod to be received in a slot or groove in the interior of the housing, thereby limiting longitudinal movement of the rod and also allowing the rod to be firmly positioned in any desired rotated position.

BRIEF DESCRIPTION OF THE DRAWINGS

FIG. 3 is a fragmentary bottom perspective of a fishing rod illustrating an attachment for the rod adapting it to be used with one form of the present invention.

FIG. 4 is a somewhat diagrammatic transverse section along line 4—4 of FIG. 1 illustrating insertion of the rod of FIG. 3 into the fishing rod support shown in FIG. 1.

FIG. 5 is a diagrammatic top perspective of an alternative form of a fishing rod support in accordance with the present invention with parts deleted for simplicity of illustration.

DETAILED DESCRIPTION

Figure 1:
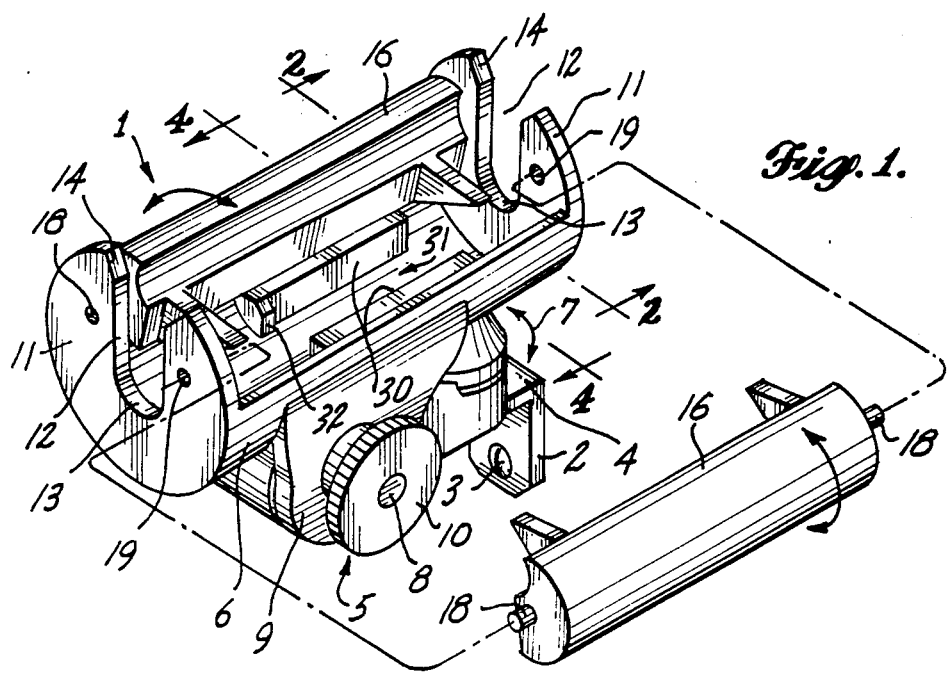
FIG. 1 is a somewhat diagrammatic top perspective of a fishing rod support in accordance with the present invention with one part, namely, one rotor, exploded away.
Figure 2:
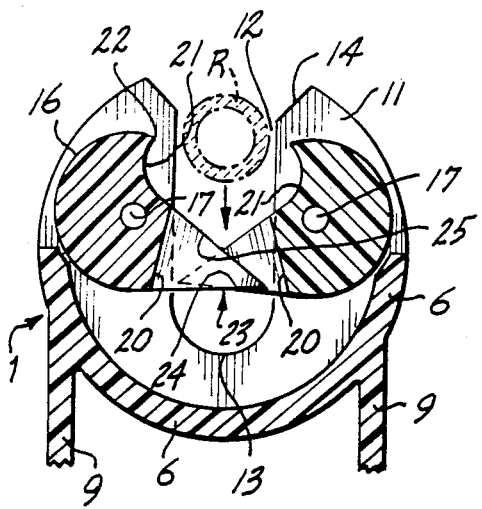
FIG. 2 is a somewhat diagrammatic transverse section along line 2—2 of FIG. 1 with parts broken away.

In the form shown in FIGS. 1 and 2, the fishing rod support 1 in accordance with the present invention is adapted for mounting on a boat for boat fishing or on a tripod or stake for bank fishing. Such support includes an angle bracket having a downward-projecting flange 2 with a hole 3 for a mounting screw or bolt and a horizontal flange 4 rigidly secured to conventional universal adjustment mechanism 5. Such adjustment mechanism adapts the main body or housing 6 of the support for swinging in a horizontal plane, as indicated by the arrow 7, and includes a horizontal shaft 8 adapting the housing 6 for swinging in a vertical plane. The housing is mounted on the adjustment mechanism 5 by downward-projecting flanges 9 having their bottom end portions journaled on shaft 8. A locknut 10, threaded on the outer end portion of shaft 8, can be provided to lock the housing 6 in any desired vertically swung position. Similar conventional mechanism can be provided to lock the housing in any desired horizontally swung position.

The housing 6 of the support is a substantially semicylindrical shell open at the top and having its ends closed by end plates 11. Each end plate is circular except for an upward-opening slot 12 having an arcuate bottom 13 which is spaced above the bottom of the shell. The end plate slots are aligned and each is of a width sufficient to allow a rod R of a desired diameter to be inserted downward into the slots as indicated in FIG. 2. The upper portion 14 of each slot is flared outward for guiding the rod R downward into the lower portion of the slot.

The support as thus far described could be used to retain a fishing rod in a desired position for a variety of different fishing applications, but only if care is taken to balance the rod with respect to the support so that the weight of the reel as compared to the drag of the line does not cause the rod to tilt up or down and thereby become dislodged. Even if the rod is initially balanced in the support, a strong force applied to the rod in direction approximately parallel to a plane bisecting the aligned upright slots could dislodge the rod from the support, particularly if the pole were disposed at a high angle of inclination. Consequently, in accordance with the present invention, one or more hook members are provided to prevent movement of the rod out of the end plate slots, except when such movement is desired by the fisherman.

Figure 2A:
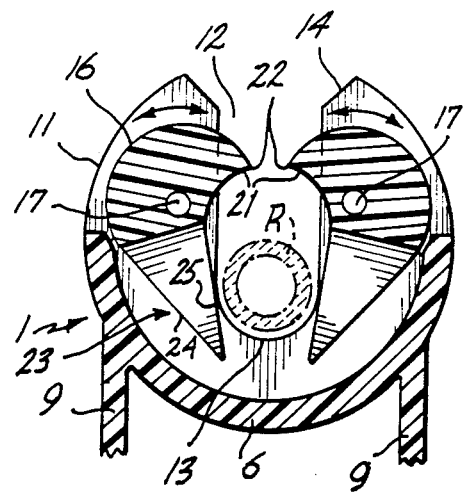
FIG. 2a is a corresponding section along line 2—2 of FIG. 1 with parts in different positions.

In the embodiment shown in FIGS. 1, 2 and 2a, the hook members are formed on long rotors 16 extending between and pivotally mounted on the end plates 11 for rotation about parallel axes 17. Such axes extend longitudinally of the housing 6 at opposite sides of the aligned upright slots 12. The rotors 16 can be formed of any suitable rigid material with longitudinal shafts 18 projecting beyond their opposite ends and journaled in holes 19 through the end plates 11 for free rotation of the rotors.

As seen in cross section in FIG. 2, each rotor 16 is substantially semicircular from approximately its bottom edge, directly below its swinging axis 17, through an angle of slightly greater than 180 degrees at the outer side of such rotor. The inner and lower side portion is cut away along the generally upright chord 20. The inner and upper portion is undercut by a concave cutout 21 forming a generally inward-projecting hook. Such concave cutout 21 extends from a point closely adjacent to the pivot axis 17 through an angle of approximately 90 degrees to the tip 22 of the hook at the upper portion of the rotor and has a radius of curvature approximately the same as the radius of the largest rod for which the support is designed.

Each rotor has two longitudinally spaced, inward-projecting, triangular legs 23 closely adjacent to the end plates 11, respectively, but out of registration with the legs of the other rotor. Each leg has a substantially horizontal bottom edge 24 extending tangentially from the bottom of the outer circular portion of its rotor and a top edge 25 inclined downward and inward tangentially from the arcuate cutout or hook portion 21. With reference to the semicircular portion of each rotor, such rotor is mounted eccentrically with its center offset outward from the pivot axis 17. Since the bulk of the weight of each rotor is disposed outboard of its swinging axis 17, the rotors are biased by gravity to the positions shown in FIG. 2 in which the legs 23 extend generally horizontally inward and the hook portions 21 are disposed outward from the opposite sides of the slots 12.

In use, the rod R is held approximately parallel to the axis of the housing 6 and is translated downward into the end plate slots 12. The rod engages the inward-projecting legs 23, wedging them apart and swinging the rotors to move the undercut hook portions 21 toward each other over the top of the rod as shown in FIG. 2a. Although biased by gravity outward, swinging of the rotors so as to move the hook portions away from each other is prevented by engagement of their now downward-projecting legs 23 against the opposite sides of the rod resting on the bottoms 13 of the slots 12.

The rod is securely held in the support until it is manually translated upward in a direction substantially perpendicular to the longitudinal axis of the housing 6 which allows the rotors to swing in opposite senses back to the position shown in FIG. 2. In the embodiment shown, the tip portions of the hook portions 21 extend substantially perpendicularly inward when in the position shown in FIG. 2a, which is preferred. It also is preferred that the tips 22 of the rotor hook portions be spaced apart slightly when the rotors are in their closed positions.

If, however, only the butt or the tip of the rod is moved up or down, the rod will be canted in the slots with the rotor legs at the leading or trailing end portion of the support engaged against a portion of the rod. For example, the rod need not be balanced in the support, or a strong downward force may be applied to the tip of the rod such as by the strong pull of a fish or hooking a snag while trolling. The rod will swing about the fulcrum formed by the bottom of one of the slots. Swinging of the rotors to release the rod is prevented, however, because the rotor legs at the opposite end portion of the support are blocked by the portion of the rod resting in the base of the other slot. Only by deliberate action of manually translating the rod upward will the rod be released, but such action is easily accomplished when desired with minimal disturbance of the line.

The hook members can be of various shapes. For the purposes of the preferred form of the invention, it is important that at least one hook member be provided which member is movable from an open position out of registration with the aligned end plate slots to a closed position extending at least partially over the slots so as to block removal of an inserted rod. It also is preferred that mechanism be provided for automatically moving the hook member by insertion of the rod which, in the preferred embodiment, is accomplished by provision of the inward-extending rotor legs 23. Further, mechanism is provided for normally moving or biasing the hook member to its open position which, in the preferred embodiment, is accomplished by providing the bulk of the weight of each rotor 16 outboard of its pivot axis 17 so that the rotor is biased to its open position by gravity.

Any portion of the length of the rod can be inserted into the support. Longitudinal-sliding movement of the rod is limited by engagement of a ferrule or eyelet against the outer side of the leading end plate. Nevertheless, for more precise positioning of the rod in the support, the rod can be provided with a tab or block 26 of the type shown in FIG. 3 which is secured to the rod R' by a band or strap 27 received in a groove of the block. The upper side of the block is concave to match the convex periphery of the rod and the width of the block is approximately the same as the diameter of the rod. The block has a narrow short end portion 28 and a wider portion 29. As best seen in FIG. 1, the support housing 6 can have inner blocks or rails 30 forming a way 31 between them. An inward-extending projection 32 is formed on the rear end of one of the rails 30. As seen in FIG. 4, when the modified rod R' is inserted into the support, the tab or block 26 is received in the way 31 and the wider block portion forms a shoulder engageable against the projection 32 so as to limit longitudinal sliding movement of the rod relative to the housing, such as if the rod is inclined sharply upward. The narrower block portion can extend past the housing projection 32 into the path of swinging movement of one of the rotor legs 23. Consequently, removal of the rod from the support requires that the rod be moved longitudinally forward a short distance before the rod is translated out of the support housing, which is an added precaution against the rod being inadvertently dislodged from the support. In addition, the rod block can be secured so as to hold the rod in any desired rotated position, such as reel up or reel down.

FIG. 5 illustrates diagrammatically an alternative embodiment with the support housing and end plates deleted. Rather than providing a continuous, generally cylindrical rotor at each side, straight shafts 18' are pivotally mounted on the housing end plates. Bent hook members 16' are secured to the inner sides of the shafts 18' and counterweights 33 are secured to the outer sides of the shafts. The hook members of the two shafts are aligned at the leading and trailing end portions of the shafts. Each hook member 16' has a leg 23' extending generally perpendicularly and linearly downward from its shaft 18' in the closed position shown in FIG. 5, and an upper hook portion 21' curved inward through an angle of approximately 90 degrees. With the rod inserted as shown in FIG. 5, outward swinging movement of the inwardly curved hook portions is prevented by engagement of the rod with the downward-projecting legs extending below the shafts. FIG. 5 illustrates canting of the rod R such that the leading portion of the rod is engaged against the bottoms of the inwardly curved hook portions 21, but outward-swinging movement of the hook portions is prevented by engagement of the downward-projecting legs 23' of the rear hook members with the trailing portion of the rod.

I claim:

1. A support for a fishing rod comprising an elongated housing having two aligned slots spaced apart longitudinally of said housing, extending transversely thereof and opening at the exterior thereof for receiving a section of the rod into said housing with the length of the rod extending longitudinally of said housing, a rotor, means mounting the rotor for swinging about an axis extending longitudinally of said housing but offset from said aligned slots, said rotor having a hook portion and being biased by gravity to an open position in which said hook portion is out of registration with said aligned slots, said rotor further having generally radially projecting leg means extending at least partway across said aligned slots when said rotor is in its open position for engagement by the rod when it is inserted into said slots so as to swing said rotor and move its hook portion into registration with said slots to block movement of the rod out of said slots, said leg means including generally radially projecting leg portions spaced axially of said rotor and generally adjacent to the opposite ends thereof.

2. The support defined in claim 1, including restraining means limiting longitudinal movement of the rod relative to the housing.

3. The support defined in claim 2 in which the restraining means includes a projection mounted on the rod, the housing having an interior projection buttable against said rod projection when the rod is inserted into the housing.

4. The support defined in claim 1, including restraining means preventing rotation of the rod after it is inserted into the housing.

5. The support defined in claim 4, in which the restraining means includes a projection mounted on the rod, the housing having an elongated groove extending longitudinally of the housing for receiving the rod projection.

6. A support for a fishing rod comprising a horizontally elongated housing having upright end plates at its opposite ends, said end plates having aligned upright slots of a width sufficient for insertion of a section of the rod into said slots with the rod extending longitudinally of said housing, two rotors mounted for swinging about parallel axes extending longitudinally of said housing at opposite sides of said slots, respectively, each of said rotors having longitudinally spaced leg portions extending inward at least partway into registration with said aligned slots for engagement of said leg portions by the rod when it is inserted so as to swing the rotors in opposite senses, and each of said rotors having an undercut hook portion at the opposite side of the swinging axis of such rotor from its inward-projecting leg portion, normally disposed in an open position out of registration with said aligned slots and moved by swinging of the rotors to a position registered with the slot means so as to block movement of the rod out of said slot means.

7. The support defined in claim 6 in which the bulk of the weight of each rotor is disposed outboard of its swinging axis for biasing such rotor by gravity to its open position.

8. The support defined in claim 5, in which the rod and the projection mounted thereon are slidable longitudinally in the elongated groove of the housing in a direction so as to position the projection in the path of movement of a leg portion of the rotor and thereby block swinging of the rotor to its open position until the rod and projection are moved longitudinally in the opposite direction.

9. The support defined in claim 1, in which the housing slots are upright and the leg portions include a flat upright inner surface adjacent to the rod after it is inserted.

10. The support defined in claim 1, including a second rotor having a hook portion and biased to an open position in which said hook portion of said second rotor is out of registration with the aligned housing slots, said second rotor further having generally radially projecting leg means including longitudinally spaced leg portions extending at least part way across the aligned slots when said second rotor is in its open position for engagement of said leg portions of said second rotor by the rod when it is inserted into the housing slots, the first rotor and said second rotor being mounted for swinging movement in opposite senses automatically by engagement of their respective leg portions by the rod when it is inserted into the housing slots.

11. A support for a fishing rod comprising a horizontally elongated housing having aligned slots of a width sufficient for insertion of a section of the rod into said slots with the rod extending longitudinally of said housing, two rotors mounted for swinging about parallel axes extending longitudinally of said housing at opposite sides of said slots, respectively, each of said rotors having longitudinally spaced leg portions extending inward at least partway into registration with said aligned slots for engagement of said leg portions by the rod when it is inserted so as to swing the rotors in opposite senses, and each of said rotors having an undercut hook portion at the opposite side of the swinging axis of such rotor from its inward-projecting leg portions, normally disposed in an open position out of registration with said aligned slots and moved by swinging of the rotors to a position registered with the slot means so as to block movement of the rod out of said slot means.

12. A support for a fishing rod comprising an elongated housing having two aligned slots spaced apart longitudinally of said housing, extending transversely thereof and opening at the exterior thereof for receiving a section of the rod into said housing with the length of the rod extending longitudinally of said housing, a rotor, means mounting the rotor for swinging about an axis extending longitudinally of said housing but offset from said aligned slots, said rotor having longitudinally spaced aligned hook portions and being biased by gravity to an open position in which said hook portions are out of registration with said aligned slots, said rotor further having longitudinally spaced, aligned, generally radially projecting leg portions extending at least partway across said aligned slots when said rotor is in its open position for engagement of said leg portions by the rod when it is inserted into said slots so as to swing said rotor and move its hook portions into registration with said slots to block movement of the rod out of said slots, said leg and hook portions being disposed, respectively, at opposite sides of the rotor axis.

* * * * *